Patented Oct. 6, 1931

1,826,681

UNITED STATES PATENT OFFICE

ALBERT F. SULZER, OF ROCHESTER, NEW YORK, ASSIGNOR TO EASTMAN KODAK COMPANY, OF ROCHESTER, NEW YORK, A CORPORATION OF NEW YORK

CELLULOSE ACETATE COMPOSITION

No Drawing.   Application filed May 9, 1927.   Serial No. 190,147.

This invention relates to a new composition of matter in which cellulose acetate is mixed or colloidized with other substances so that the resulting products can be used in the plastic and analogous arts, such for instance, as film manufacture and varnish manufacture. One object of the invention is to provide a composition which may be made into permanently transparent, strong and flexible sheets or films of desired thinness, which are substantially water-proof, are unaffected by ordinary photographic fluid treatments, possess the desired properties of a support for light-sensitive photographic coatings, and are of low inflammability. Other objects will hereinafter appear.

I have found that a composition having the desirable qualities hereinabove enumerated can be produced by mixing cellulose derivatives, such as cellulose acetate, or other organic esters of cellulose, cellulose ether, or even cellulose nitrate, with one or more phosphoric esters of the alkyl ethers of the polyethylene glycols. Such esters may be derived from ethers or di, tri or tetraethylene glycol, the ether groups being preferably methyl, ethyl, propyl, butyl or amyl. The formulæ for the various ethers mentioned are as follows, R representing either a methyl, ethyl, propyl, butyl or amyl group:

Diethylene glycol monoalkyl ether
R—O—CH$_2$CH$_2$—O—CH$_2$CH$_2$OH
Triethylene glycol monoalkyl ether
R—O—CH$_2$CH$_2$—O—CH$_2$CH$_2$—O—CH$_2$CH$_2$OH
Tetraethylene glycol monoalkyl ether
R—O—CH$_2$CH$_2$—O—CH$_2$CH$_2$—O—CH$_2$CH$_2$—O—CH$_2$CH$_2$OH The phosphoric esters referred to may be prepared from preferably the monoalkyl ethers of the polyethylene glycols by any conventional esterifying method, such as by reacting upon the ester with phosphorus oxychlorid (POCl$_3$) until evolution of hydrochloric acid stops. The esters thus produced are the ortho phosphoric esters (the ortho esters being those normally utilized) and have the general formula:

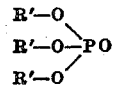

where R' is everything in the above ether formulæ with the exception of the terminal OH group. These phosphoric esters are then hydrolized to the dihydrogen alkyl ether of the glycol involved giving a compound having the general formula:

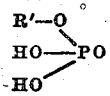

Hydrolysis of the ether to the dihydrogen compound appears to be the more convenient and hence the more economical of those mentioned.

The phosphoric esters described have a distinct solvent action toward the cellulose derivatives mentioned and although this solubility is not great, nevertheless, films that are formed from a dope or composition containing these esters are brilliantly transparent. The difficulty often experienced of opaque or hazy film resulting from the precipitation of the high boilers which have low solubility is not experienced when these esters are used.

In carrying out an illustrative embodiment of my invention, 100 parts of cellulose acetate of the acetone-soluble species are dissolved along with 2 to 50 parts (say 20) by weight of the dihydrogen phosphoric ester of the monoethyl ether of tetraethylene glycol in a volatile liquid containing a common solvent, say 300 to 600 parts of acetone. While the phosphoric esters of monoalkyl polyethylene glycols have solvent action with respect to cellulose acetate by themselves, nevertheless it is desirable to have a volatile solvent present also. This gives a flowable film-forming composition or dope suitable for spreading out into coatings, which upon the evaporation of the common solvent leave transparent, tough, flexible sheets of low inflammability. The customary film making processes and apparatus may be used with the solution. In place of the cellulose acetate in the above example, there may be substituted an equal weight of cellulose nitrate, such as is commonly used in film manufacture, or mixtures of cellulose nitrate and cellulose acetate may be substituted. Likewise I may replace the cellulose acetate, weight for weight, with any of the acetone-soluble organic esters of cellulose disclosed in the application of Hans T. Clarke and Carl J. Malm, Serial No. 179,177, filed March 28th, 1927, for process of making cellulose esters of organic acids. I can also employ ethyl cellulose in place of cellulose acetate using, however, as the common solvent, a mixture of equal parts of ethyl alcohol and chloroform instead of acetone.

Where compositions of greater ability to flow are desired, the amount of volatile solvent may be increased and diluents, such as benzol, ethyl alcohol, methyl alcohol, and the like may be added, although they should not be in such an excess as to produce precipitation or the production of a hazy or whitish film. In order to control the rate of the evaporation, substances of low or intermediate volatility may be added, such as the higher alcohols, like the various propyl, butyl and amyl alcohols, or mixtures of them. An amount of butyl alcohol, for example, which is useful, may be approximately one-tenth to one-fifth of the weight of the cellulose acetate in the above formula. Part of this alcohol will remain in the film and enhance its flexibility. Other substances of low volatility may be used, such as camphor, monochlornaphthalene, and the like. The proportion of these, or any mixture of them, should not, however, be sufficient to cause premature precipitation or whitening during the use of the solution, especially where the latter is to be made into photographic film. The ingredients are of the commercial type and are purified sufficiently for the purposes to which they are put, those for film manufacture being chosen so as to have the customary practical freedom from color, and freedom from impurities which would impair the transparency or injure the emulsions.

Having thus described my invention, what I claim as new and desire to secure by Letters Patent is:

1. A composition of matter comprising a cellulose derivative and a phosphoric ester of an alkyl ether of a polyethylene glycol.

2. A composition of matter comprising a cellulose derivative and a phosphoric ester of a monoalkyl ether of tetraethylene glycol.

3. A composition of matter comprising a cellulose derivative and the dihydrogen phosphoric ester of the monoethyl ether of tetraethylene glycol.

4. A composition in a colloidized state comprising cellulose acetate and a phosphoric ester of a monoalkyl ether of a polyethylene glycol.

5. A flowable film-forming composition comprising cellulose acetate, a phosphoric ester of a monoalkyl ether of tetraethylene glycol, and a common volatile solvent.

6. A flowable film-forming composition comprising 100 parts by weight of acetone-soluble cellulose acetate, 2 to 50 parts by weight of the dihydrogen phosphoric ester of the monoethyl ether of tetraethylene glycol, and over 300 parts of a liquid vehicle including a common volatile solvent.

Signed at Rochester, New York, this 3rd day of May, 1927.

ALBERT F. SULZER.